United States Patent [19]
Shouji et al.

[11] Patent Number: 6,010,753
[45] Date of Patent: Jan. 4, 2000

[54] THIN FILM MAGNETIC HEAD WITH SPECIAL SHAPED POLE AND MANUFACTURE METHOD THEREOF

[75] Inventors: Shigeru Shouji; Atsushi Toyoda, both of Hamamatsu, Japan

[73] Assignee: Yamaha Corporation, Japan

[21] Appl. No.: 09/238,998

[22] Filed: Jan. 28, 1998

Related U.S. Application Data

[62] Division of application No. 08/556,574, Nov. 13, 1995.

[30] Foreign Application Priority Data

Nov. 14, 1994 [JP] Japan .................................. 6-304300

[51] Int. Cl.[7] ............................ C23C 14/02; C23C 14/00
[52] U.S. Cl. .................... 427/534; 204/192.34; 427/129; 427/130; 427/131; 427/235; 427/264; 427/270; 427/275; 427/309; 427/331; 427/402

[58] Field of Search ...................... 427/534, 129, 427/130, 131, 235, 264, 270, 275, 309, 331, 402; 204/192.34

*Primary Examiner*—Bernard Pianalto
*Attorney, Agent, or Firm*—Ostrolenk, Faber, Gerb & Soffen, LLP

[57] ABSTRACT

The leading edge of a lower pole is constituted by a protruded central parallel portion, opposite end parallel portions, and slanted portions coupling the central parallel portion and the opposite end parallel portions. The width $T_{wc}$ of the central parallel portion is set to 10 to 25% of the total width $T_{wa}$ of the lower pole. The thickness P1' of the opposite end portion is set in the range from $\frac{1}{3}$ or thicker to $\frac{2}{3}$ or thinner than the thickness P19 of the central parallel portion.

13 Claims, 20 Drawing Sheets

THIN FILM MAGNETIC HEAD WITH SPECIAL SHAPED POLE AND MANUFACTURE METHOD THEREOF

This is a division of application Ser. No. 08/556,574, filed Nov. 13, 1995.

BACKGROUND OF THE INVENTION a) Field of the Invention

The present invention relates to a thin film magnetic head and a method of manufacturing the same, capable of reducing dips of a reproduction signal and improving the reproduction characteristics.

b) Description of the Related Art

A thin film magnetic head is used as a recording/reproducing means of a magnetic disc drive. A conventional magnetic head used by a magnetic disc drive is shown in FIGS. 2A, 2B and 2C. FIG. 2A is a front view of the magnetic head, FIG. 2B is a cross sectional view taken along line A—A in FIG. 2A, and FIG. 2C shows a pole end surface as viewed from line B—B. In this example, a coil is made of three coil layers 20, 24, and 28.

The thin film magnetic head 1 is formed on a slider substrate 10 having a polished clean mirror surface. The slider substrate 10 is made of, for example, a ceramic plate of $Al_2O_3$-TiC. A protection layer 12 made of inorganic insulating material such as $SiO_2$ and $Al_2O_3$ is deposited on the substrate 10 to a thickness of several tens $\mu$m by sputtering. A lower magnetic film 14 is laminated upon the protection layer 12 by electroplating. A magnetic gap layer 16 is laminated (deposited) upon the lower magnetic layer 14 by sputtering, the magnetic gap layer 16 forming a magnetic gap 17 at the pole portion of the magnetic head. The magnetic gap layer 16 is made of such as $SiO_2$ and $Al_2O_3$ like the protection layer 12.

A first insulating layer 18 is laminated upon the magnetic gap layer 16. This insulating layer 18 is usually made of positive photoresist thermally cured and stabilized. On the first insulating layer 18, a first coil layer 20 made of Cu or other metals is deposited by electroplating to a thickness of several $\mu$m. On the first coil layer 20, a second insulating layer 22, a second coil layer 24, a third insulating layer 26, a third coil layer 28, and a fourth insulating layer 30 are sequentially laminated in this order by similar methods as above.

On the fourth insulating layer 30, an upper magnetic layer 32 is formed by electroplating. A throat height TH is defined by the portion where the upper and lower magnetic layers 32 and 14 face in parallel, with the magnetic gap 17 being interposed therebetween. The end portion 90 of the upper magnetic layer 32 opposite to the pole side is in tight contact with the lower magnetic layer 14. A passivation layer 34 is formed on the whole surface of the upper magnetic layer 32 by sputtering.

As shown in FIG. 2C, the exposed pole surfaces of the upper and lower magnetic layers 14 and 32 of the magnetic head 1 have leading and trailing edges 40 and 42 of lower (leading) and upper (trailing) poles 36 and 38. The leading and trailing edges 40 and 42 are linear and parallel to the magnetic gap 17. The thin film magnetic head 1 moves relative to a magnetic recording medium, and the leading pole 40 tracks the medium first and the trailing pole 30 follows thereafter.

A reproduction output waveform of a magnetic head having the edge shape shown in FIGS. 2A, 2B and 2C is illustrated in FIG. 3. The abscissa of the waveform represents a reproduction position, and the ordinate represents a reproduction signal voltage. A solitary wave having a peak voltage $V_L$ appears at the reproduction position where the magnetizing direction of a recording medium is inverted. In addition to this output of a voltage $V_L$, dips (undershoots) d1 and d2 are generated. The dip d1 is generated because the thickness P1 of the leading (lower) pole 36 is finite, and the dip d2 is generated because the thickness P2 of the trailing (upper) pole 38 is finite. The larger these dips d1 and d2, the more errors are likely to be generated in a PRML (partial response maximum likelihood) signal process. As shown in FIG. 4, in the PRML signal process, a signal whose dips are cut is generally used. In order to cut the dips, a signal is also required to be cut. Therefore, the larger the dips, the more the signal is required to be cut. This leads to a smaller SN margin and a larger probability of errors.

In order to reduce dips, a pole shape such as shown in FIG. 5 has been proposed. Four corners of each pole 36, 38 are trimmed from the pole end surface by ion etching or the like. With this pole shape, however, the following disadvantage occurs. After a wafer is formed with a number of thin film magnetic heads, this wafer is required to be cut into rows (rectangles) so that after the cut surface of each row is processed to realize a predetermined throat height, the four corners of each pole 36, 38 are trimmed by photolithography or etching. The four corners of each pole 36, 38 cannot be trimmed after the wafer is cut into rows, because the end surface of the pole 36, 38 exposes not on the wafer surface side but on the row cut side. Therefore, each row is required to be processed independently so that productivity becomes low.

Other pole shapes reducing dips have been proposed by the assignee of the present invention, in the embodiments of Japanese Patent Application No.3-81458. The cross sections of these pole shapes are shown in FIGS. 6A, 6B, 6C and 6D. Since processes of realizing these pole shapes can be performed on the wafer surface side, productivity is better than the process to be performed on the pole end side as illustrated in FIG. 5.

Among the pole shapes shown in FIGS. 6A 6B, 6C and 6D, the pole shapes shown in FIGS. 6A and 6B are thickened with a thickness P1 toward one of or both sides of the lower (leading) edge 36 of the lower pole 36. Therefore, the off-track overwrite performance for adjacent tracks is deteriorated. Therefore, a distance between adjacent tracks is required to be widened, which results in a low record density. In the case of a leading edge 40 of a protruding arc shape shown in FIG. 6C, it is necessary to form an underlying layer with a recess of an arc cross section. It is not easy to form such a downward arc recess on the surface of the underlying layer or protection layer 12 (FIGS. 2B and 2C) by photolithography or etching. Only one method is to mechanically form such a curved recess and the productivity is lowered.

In contrast with the above pole shapes, a leading edge 40 shown in FIG. 6D is trapezoidal and has a central portion of the lower pole 36 with a thickness P1 and opposite end portions with a thickness P1' thinner than P1. This pole shape has a good off-track overwrite performance for adjacent tracks because the opposite end portions of the lower pole 36 have a thinner thickness P1'. In addition, since this leading edge has a straight line shape, it can be realized by photolithography or etching, and the productivity is good.

However, even the leading edge shape shown in FIG. 6D may increase wiggles and degrade the overwrite performance, depending upon the dimensions of the leading edge shape.

SUMMARY OF THE INVENTION

An object of the present invention is to provide a thin film magnetic head having the dimensions of a leading edge shape capable of reducing wiggles and improving an over-write performance, and a method of manufacturing such a thin film magnetic head.

According to one aspect of the present invention, there is provided a thin film magnetic head having a lower pole at a head end portion of a lower magnetic layer, a magnetic gap formed on the lower pole, an edge of the lower pole on a side to the magnetic gap having a shape comprising: a central parallel portion formed at a central portion of the lower pole in a width direction and in parallel to the magnetic gap, a width of the central parallel portion being set to 10 to 25% of the total width of the lower pole; side end parallel portions formed at each opposite end portion of the lower pole and in parallel to the magnetic gap, a total width of the side end parallel portions being set to 20 to 40% of the total width of the lower pole; and outward slanted portions each coupling a corresponding one of the corresponding side end parallel portions and the central parallel portion and being slanted in a direction of moving nearer to the magnetic gap at a more outward position, wherein a thickness of the lower pole at the side end portion is ⅓ to ⅔ a thickness of the lower pole at the central parallel portion.

With the width of the central parallel portion being set to 10 to 25% of the total width of the lower pole, dips of a reproduction waveform can be reduced to about 5% or smaller of the peak amplitude of the solitary signal, and wiggles can be reduced. With the total width of the side end parallel portions being set to 20 to 40% of the total width of the lower pole, it is possible to prevent the off-track over-write characteristics from being weakened even if the amplitude of the undershoot is lowered. The shape of an edge, e.g. the leading edge can be formed by photolithography or etching on the side of the wafer surface. Therefore, the productivity is improved.

According to another aspect of the present invention, there is provided a method of manufacturing a thin film magnetic head comprising the steps of: applying particle beams generally vertically to a surface of an inorganic insulating substrate to mill the inorganic insulating substrate and form a recess; applying particle beams generally vertically to a surface of the recess and a nearby area to reform the side wall surface of the recess into a slanted surface contacting the bottom of the recess; forming a pole material layer on the surface of the inorganic insulating substrate to fill the recess with the pole material layer and planarizing the surface of the pole material layer generally in parallel with the bottom surface of the recess; and forming a non-magnetic layer on the surface of the pole material layer to form a magnetic gap.

With this method of manufacturing a thin film magnetic head, the slanted surface matching the conditions of the thin film magnetic head can be formed precisely and a high yield is possible.

DETAILED DESCRIPTION OF THE PREFERRED EMBODIMENTS

Figure 1A:
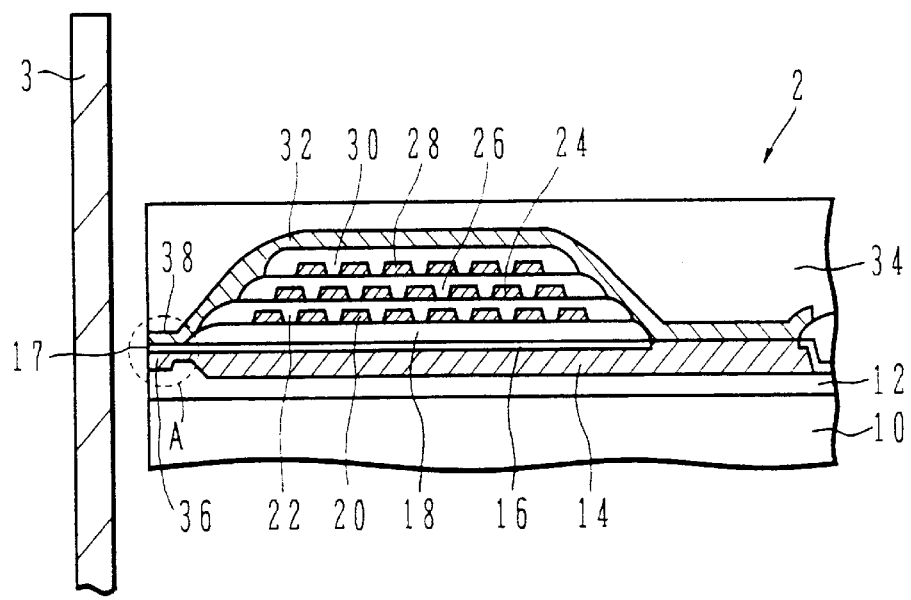
FIG. 1A is a cross sectional view of a thin film magnetic head facing with a recording medium according to an embodiment of the invention.
Figure 2A:
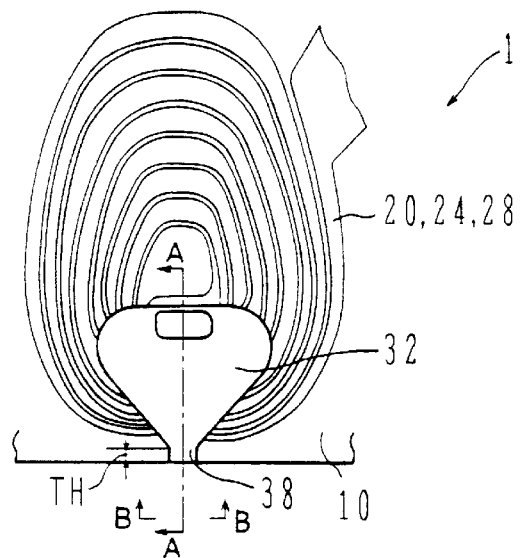
FIG. 2A shows a conventional thin film magnetic head.
Figure 7:
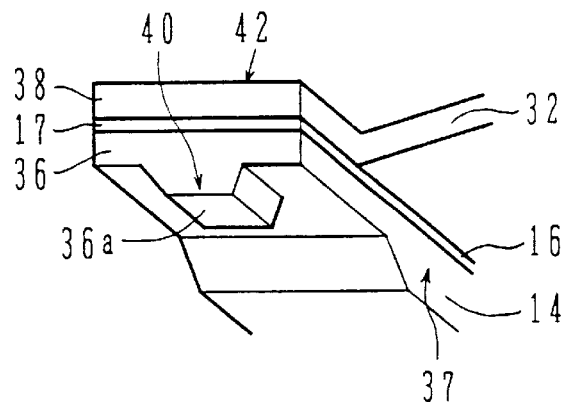
FIG. 7 is a perspective view showing the structure of the poles of the thin film magnetic head shown in FIG. 1A.

A thin film magnetic head according to an embodiment of the invention is shown in FIG. 1A, and the perspective view of the main part of the head is shown in FIG. 7. Like elements to those of the conventional thin film magnetic head shown in FIG. 2A are represented by using identical reference numerals. The thin film magnetic head 2 can record and reproduce information to and from a magnetic recording medium 3 which faces poles 36 and 38 of the head 2.

The thin film magnetic head 2 is formed on a slider substrate 10 having a polished clean flat surface. The slider substrate 10 is made of, for example, a ceramic plate of $Al_2O_3$-TiC. A protection layer 12 made of inorganic insulating material such as $SiO_2$ and $Al_2O_3$ is deposited on the substrate 10 to a thickness of ten and several μm by sputtering. A lower magnetic layer 14 is laminated (deposited) upon the protection layer 12 by electroplating. The lower magnetic layer 14 is made of, for example, permalloy (NiFe alloy). A magnetic gap layer 16 is laminated (deposited) upon the lower magnetic layer 14 by sputtering, the magnetic gap layer 16 forming a magnetic gap 17 at the pole portion of the magnetic head. The magnetic gap layer 16 is made of non-magnetic material such as $SiO_2$ and $Al_2O_3$ (alumina) similar to the protection layer 12.

A first insulating layer 18 is laminated upon the magnetic gap layer 16. This insulating layer 18 is usually made of positive photoresist thermally cured and stabilized. On the first insulating layer 18, a first coil layer 20 made of Cu or other metals is deposited by electroplating to a thickness of several $\mu$m. On the first coil layer 20, a second insulating layer 22, a second coil layer 24, a third insulating layer 26, a third coil layer 28, and a fourth insulating layer 30 are sequentially laminated in this order by similar methods as On the fourth insulating layer 30, an upper magnetic layer 32 is formed by electroplating. The upper magnetic layer 32 is made of, for example, permalloy. A throat height TH is defined by the portion where the upper and lower magnetic layers 32 and 14 face in parallel, with the magnetic gap 17 being interposed therebetween. The end portion of the upper magnetic layer 32 opposite to the pole side (closure) is in tight contact with the lower magnetic layer 14 to be magnetically connected. A passivation layer 34 is formed on the whole surface of the upper magnetic layer 32 by sputtering. When current flows through the coil to perform write operation, magnetic flux is induced. The induced magnetic flux is guided in the upper magnetic layer 32 and the lower magnetic layer 14 and through the closure where the upper magnetic layer 32 and the lower magnetic layer 14 are held in contact with each other. The induced magnetic flux leaks at an exposed pole end surface to perform recording on the magnetic recording medium 3.

In case of read operation, magnetic flux generated from the magnetic recording medium 3 enters into the exposed pole end surface and is guided through the upper magnetic layer 32 and the lower magnetic layer 14 to thereby induce voltage in the coils. The thin film magnetic head detects magnetic flux amount based on the induced voltage.

Figure 1B:
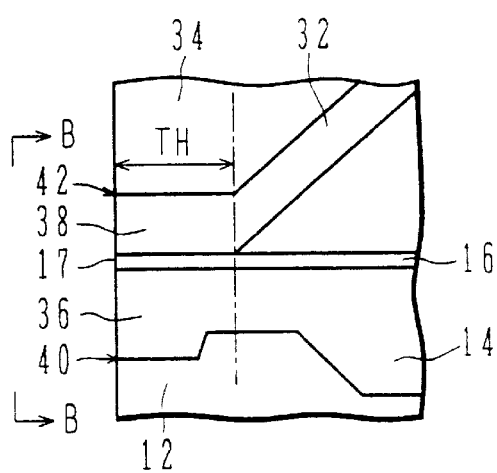
FIG. 1B is an enlarged view of a portion A of FIG. 1A.
Figure 1C:
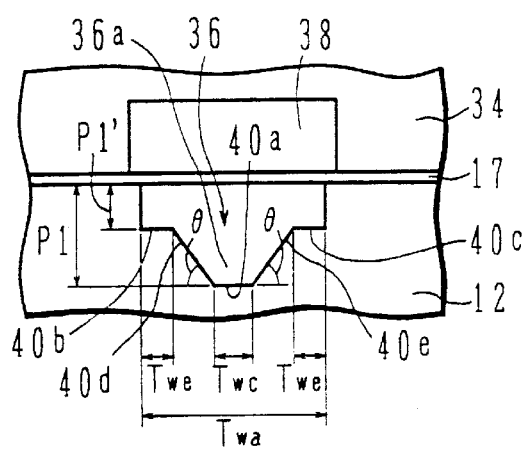
FIG. 1C shows the pole end surface as viewed from line B—B of FIG. 1B.

The structure of the portion indicated by A in FIG. 1A is shown enlarged in FIG. 1B, and the exposed pole end surface is shown in FIG. 1C as viewed from line B—B of FIG. 1B. The lower (leading) pole 36 of the lower magnetic layer 14 has a trapezoidal projection 36a formed at the central portion thereof on the exposed pole end surface side, i.e., on the edge (leading edge 40) side opposite to the other edge on the magnetic gap 17 side. Because of this projection 36a, the lower pole 36 is thick at the central portion and thin at the side end portions. As shown in FIG. 1C, the leading edge 40 is symmetrical with a width center line of the lower pole 36 and is configured by a central parallel portion 40a, side end portions 40b and 40c, and slanted portions 40d and 40e. The central parallel portion 40a is formed at generally the central portion of the lower pole 36 in the width direction and in generally parallel to the magnetic gap 17. Each side end parallel portion 40b, 40c is formed at each side end portion of the lower pole 36 and in generally parallel to the magnetic gap 17. Each outward slanted portion 40d, 40e couples the corresponding side end parallel portion 40b, 40c and the central parallel portion 40a and is slanted in the direction of moving nearer to the magnetic gap 17 at the more outward position.

In order to reduce dips on an output waveform, portions in the exposed pole end surface having a reduced width (for example, Twa is 5 $\mu$m or less) are set as follows.

Twa is defined as a full width along a Lateral direction (hereinafter referred to as the full lateral width) of the lower (leading) pole 36 in the exposed pole end surface. In the present invention, the lateral direction means a direction which is substantially parallel to both of a plane of a magnetic recording medium and a plane of a substrate on which a thin film magnetic head is formed. Twc is defined as a lateral width of the central parallel portion 40a. Twe is defined as a lateral width of the side end portions 40b and 40c.

Further, in the present invention, the vertical direction is defined as a direction which is substantially parallel to a plane of the magnetic recording medium and substantially vertical to a plane of a substrate on which a thin film magnetic head is formed. Therefore, the vertical direction is vertical to the lateral direction.

The width $T_{wc}$ of the central parallel portion 40a is preferably made narrow. However, if $T_{wc}$ is narrower than 10% of the reduced total width $T_{wa}$ of the lower pole 36 (for example Twa is 5 $\mu$m or less), the anisotropy of induction magnetic field is disturbed at the initial stage of growing the lower pole 36 by electroplating, and the disturbed anisotropy becomes a cause of increased wiggles or other undesired phenomena. Therefore, $T_{wc}$ is preferably 10% of Twa or wider. On the other hand, if $T_{wc}$ is wider than 25% of $T_{wa}$, dips increase on a reproduction signal exceeds 5% of the peak voltage of a solitary wave. Therefore, it is preferable to set ratio of $T_{wc}$ to Twa to be:

$0.10 \leq T_{wc}/T_{wa} \leq 0.25$.

In order to reduce dips on an output waveform, the width $T_{we}$ of the side end parallel portion 40b, 40c is also preferable made narrow. However, if $T_{we}$ is too narrow, a write ability (overwrite performance) is weakened near at the poles. Therefore, it is preferable that the collective widths ($2 \times T_{we}$) of the side end parallel portions 40b and 40c are 20% of $T_{wa}$ or wider (i.e. 10% or wider for each width). On the other hand, if $T_{we}$ for both the two portions 40b and 40c is wider than 40% of $T_{wa}$, dips on a reproduction signal become large. Therefore, it is preferable to set ratio of $2 \times T_{we}$ to Twa to be:

$0.20 \leq 2 \times T_{we}/T_{wa} \leq 0.40$ (for both the portions)

$0.10 \leq T_{we}/T_{wa} \leq 0.20$ (for each portion).

The thickness P1 of the lower pole at the central parallel portion 40a is required to be 3.5 $\mu$m at the minimum if permalloy is used as the core material. If the thickness is less than 3.5 $\mu$m, the amount of leakage fluxes through the magnetic gap 17 at the pole end surface reduces and a sufficient write ability cannot be obtained. The thickness P1' of the lower pole at the side end parallel portion 40b, 40c along the vertical direction is preferably set to be:

$P1/3 < P1' < 2 \times P1/3$.

If an angle $\theta$ between the central parallel portion 40a and the slanted portion 40d, 40e is set larger, the track width (corresponding to $T_{wa}$) can be made narrower. However, this angle $\theta$ is set to 40° to 60° according to a manufacture method to be described later. Therefore, the track width $T_{wa}$ satisfying the above conditions is automatically determined if the thickness P1 of the lower pole is determined. The condition of minimizing the track width $T_{wa}$ under the above conditions will be discussed. The angle $\theta$ is now assumed to be 45° The track width $T_{wa}$ can be made narrower as the thickness P1' is made greater. If P1 is 3.5 $\mu$m, the maximum allowable P1' is 2.4 $\mu$m. With the thickness P1' of 2.4 $\mu$m, the track width Twa takes a minimum value of about 3.4 $\mu$m wide. It can be understood that the above conditions allow a sufficiently narrow track width to be realized, when considering a track width narrower than 5 μm of a state-of-the-art magnetic head. If magnetic material having a larger coercive force and permeability is used as the core material, the restriction on P1 is relieved (P1 can be made thinner) and the track width Twa can be made narrower.

Figure 2B:
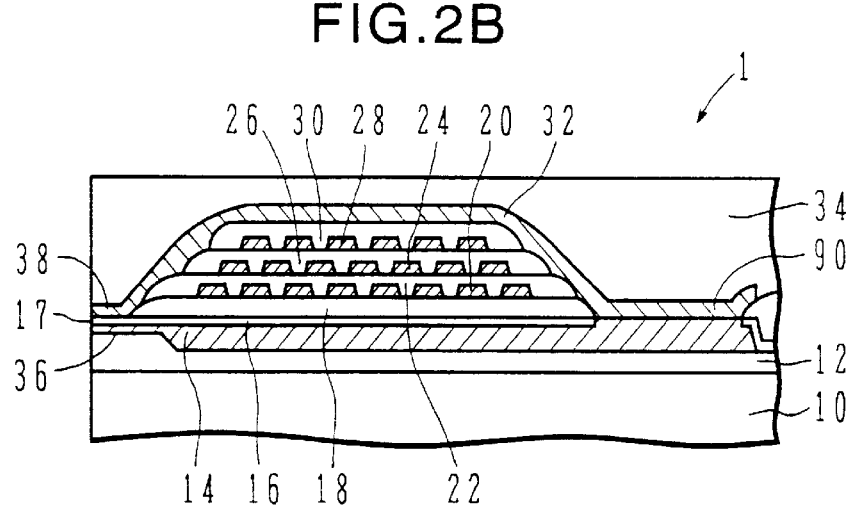
FIG. 2B is a cross section taken along line A—A of FIG. 2A.
Figure 2C:
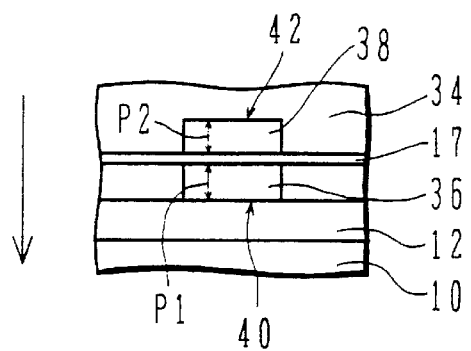
FIG. 2C shows the pole end surface as viewed from line B—B of FIG. 2A.
Figure 3:
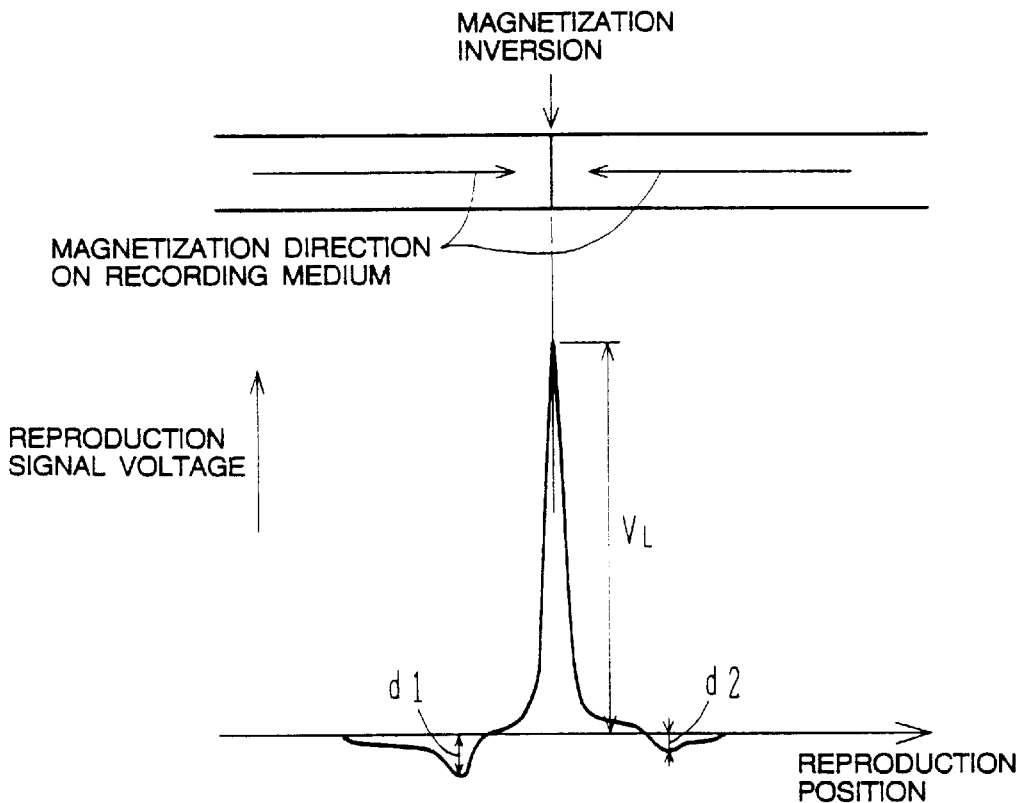
FIG. 3 shows a waveform with dips of a reproduction signal outputted from the conventional thin film magnetic head shown in FIG. 2A.
Figure 4:
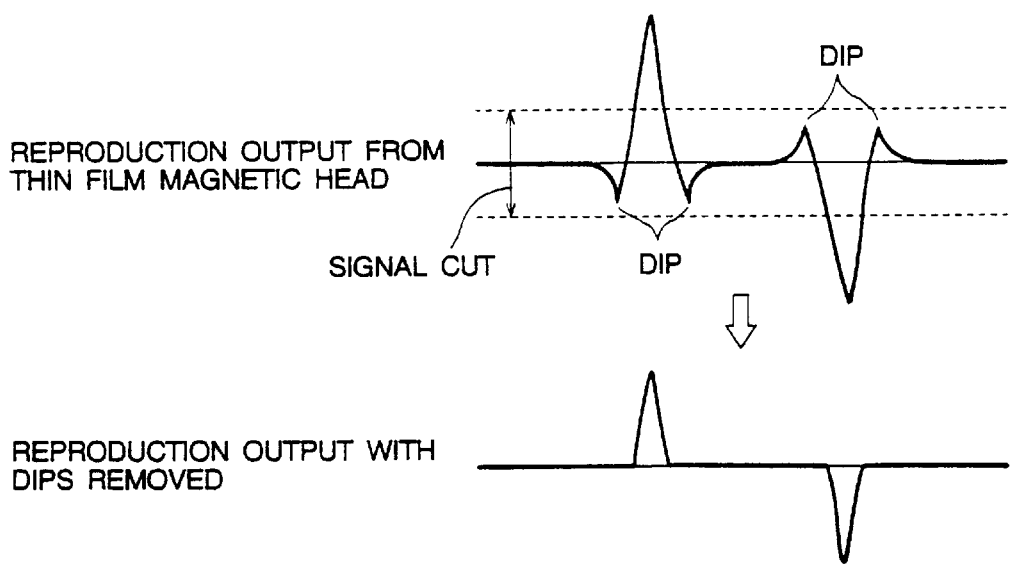
FIG. 4 shows waveforms illustrating how dips are removed from the reproduction signal shown in FIG. 3.
Figure 5:
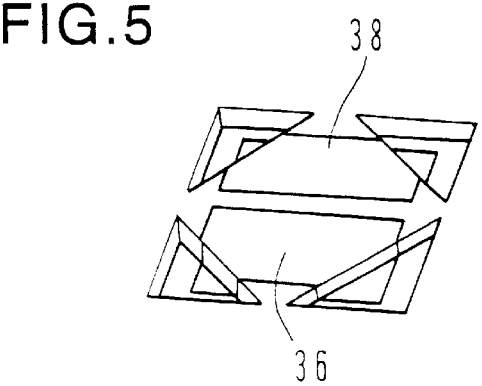
FIG. 5 is a perspective view of a conventional pole shape capable of reducing dips.
Figure 6A:
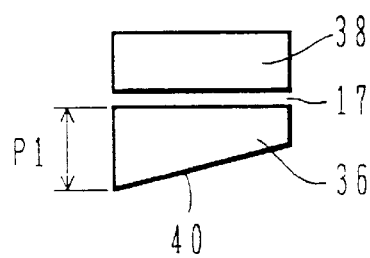
FIGS. 6A, 6B, 6C and 6D show other conventional pole shapes capable of reducing dips.
Figure 6B:
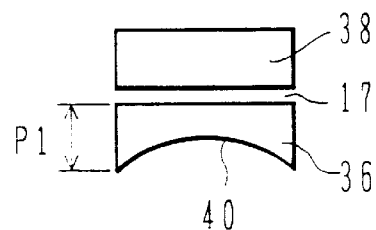
Figure 6C:
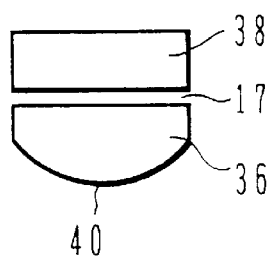
Figure 6D:
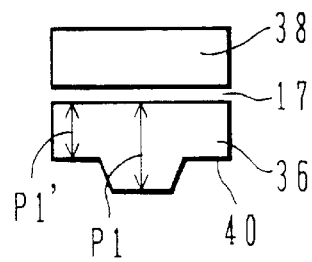

With the above-described dimensions of the pole shape, dips on an output waveform can be reduced. In this embodiment, the peak of dips can be reduced to 5% or lower of the peak voltage $V_L$ of the solitary wave shown in FIG. 3, where as the peak is 8 to 12% if conventional parallel poles shown in FIGS. 2A to 2C are used. A signal waveform suitable for the PRML signal process can therefore be obtained and the record density of a magnetic disk drive can be improved. Furthermore, the generation of wiggles can be prevented and errors are reduced. Still further, since all the leading edge shapes of a number of thin film magnetic heads on a wafer can be formed by the same processes (photolithography, etching, and other processes), the productivity is excellent.

Next, a method of manufacturing a thin film magnetic head according to an embodiment will be described. In this embodiment method, the thin film magnetic head 2 such as shown in FIG. 1A is manufactured. In this method, the lower pole 36 is formed in the following processes. An inorganic insulating film (protection film 12) is vertically milled by ion etching or the like to form a recess. Next, an oblique surface is formed on the side wall of the recess by ion etching. An underlying metal film is then formed over the whole surface of the wafer, and thereafter the underlying metal film is cut by using a resist pattern to determine the width of the lower pole. The lower pole is then formed by plating and lapped to planarize the surface of the lower pole to form the gap surface thereof. The detailed processes of this method will be described with reference to FIGS. 8A to 13B.

(1) Resist Coating

Figure 8A:
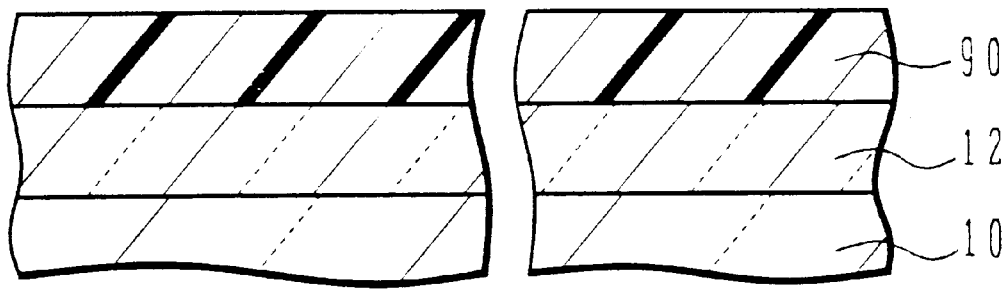
FIGS. 8A, 8B, 8C, 8D, 8E and 8F are cross sectional views of a high film magnetic head illustrating the processes of a method of manufacturing a thin film magnetic head according to an embodiment of the invention.

Referring to FIG. 8A, a smooth protection layer 12 such as aluminum is formed on a substrate 10 made of, for example, $Al_2O_3$-TiC. A resist film 90 is coated on the whole surface of the protection layer 12. The resist film 90 is used for forming a recess in the protection layer 12 on which a lower magnetic layer 14 is formed.

(2) Pattern Cutting

Figure 8B:
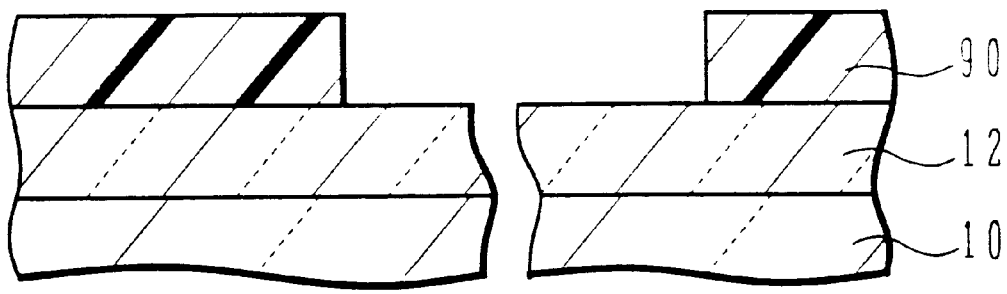

Referring to FIG. 8B, the resist film 90 is vertically cut by photolithography at the area where the recess is formed in the protection layer 12.

(3) Heating and Melting

Figure 8C:
Figure 8C:
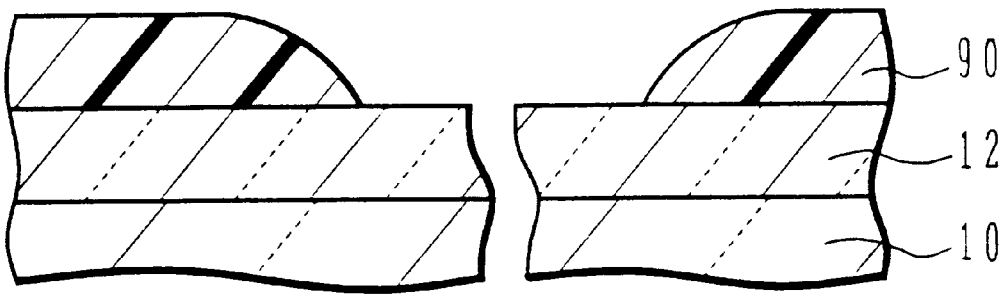

Referring to FIG. 8C, the resist film 90 is heated and reflowed.

(4) Ion Milling

Figure 8D:
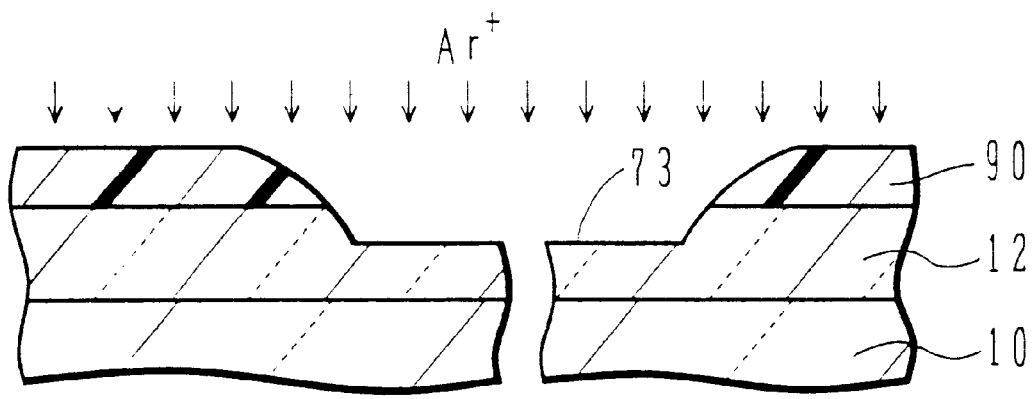

Referring to FIG. 8D, argon ions or the like are applied over the whole surface of the wafer by using an ion milling apparatus (e.g., Hitachi, Ltd. IML-250) under the conditions of an acceleration voltage of 600 V, a deceleration voltage of −300 V, and an Ar pressure of $2\times10^{-4}$ Torr. With this milling, the surface of the protection layer 12 is cut and a recess 73 is formed in the protection layer 12.

(5) End of Ion Milling

Figure 8E:
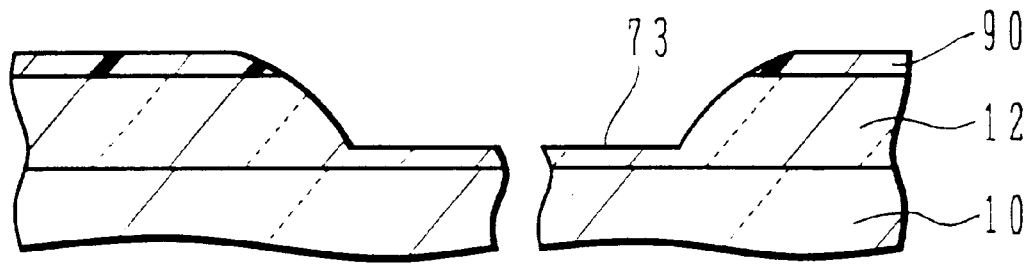

Referring to FIG. 8E, when the recess 73 having a predetermined depth is formed, ion milling is terminated.

(6) Removal of Resist

Figure 8F:
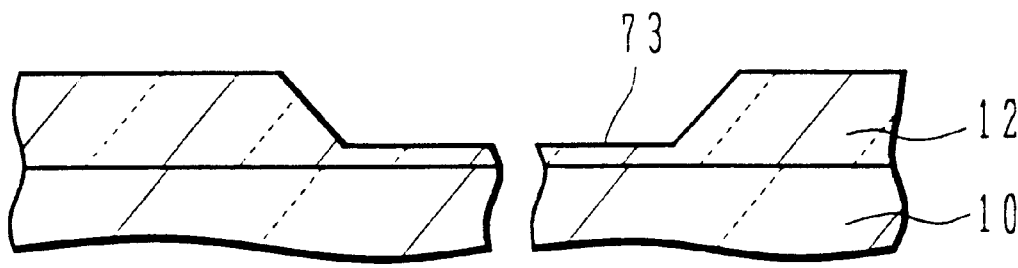

Referring to FIG. 8F, the resist film 90 is removed to prepare the wafer having the recess 73 in the protection layer 12, the recess 73 being used for forming the lower core.

(7) Resist Coating and Cutting

Figure 9A:
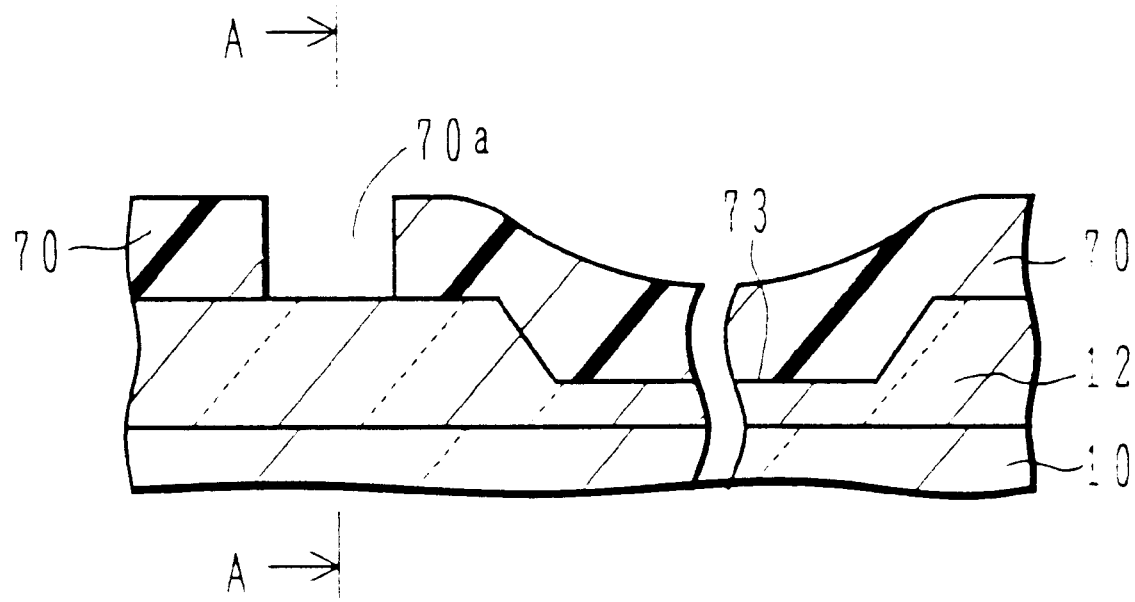
FIGS. 9A, 9B, 9C, 9D, 9E and 9F are cross sectional views illustrating the processes to be followed by the processes illustrated in FIGS. 8A, 8B, 8C, 8D, 8E and 8F.
Figure 9B:
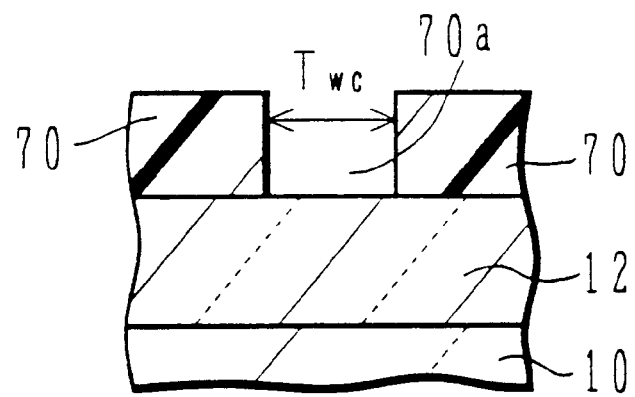

FIG. 9A is a cross sectional side view of the thin film magnetic head, and FIG. 9B is a cross sectional front view as viewed from line A—A of FIG. 9A. A resist film 70 is coated to a thickness of about 8 μm over the whole surface of the wafer shown in FIG. 8F. The resist film 70 is used for forming a recess at an area where the lower pole of the lower magnetic layer 14 is formed. The resist film 70 is vertically cut by photolithography to form a recess or opening 70a having a lateral width $T_{wc}$ corresponding to that of the central parallel portion 40a of the leading edge 40 of the lower pole 36.

(8) Vertical Milling by Ion Etching

Figure 9C:
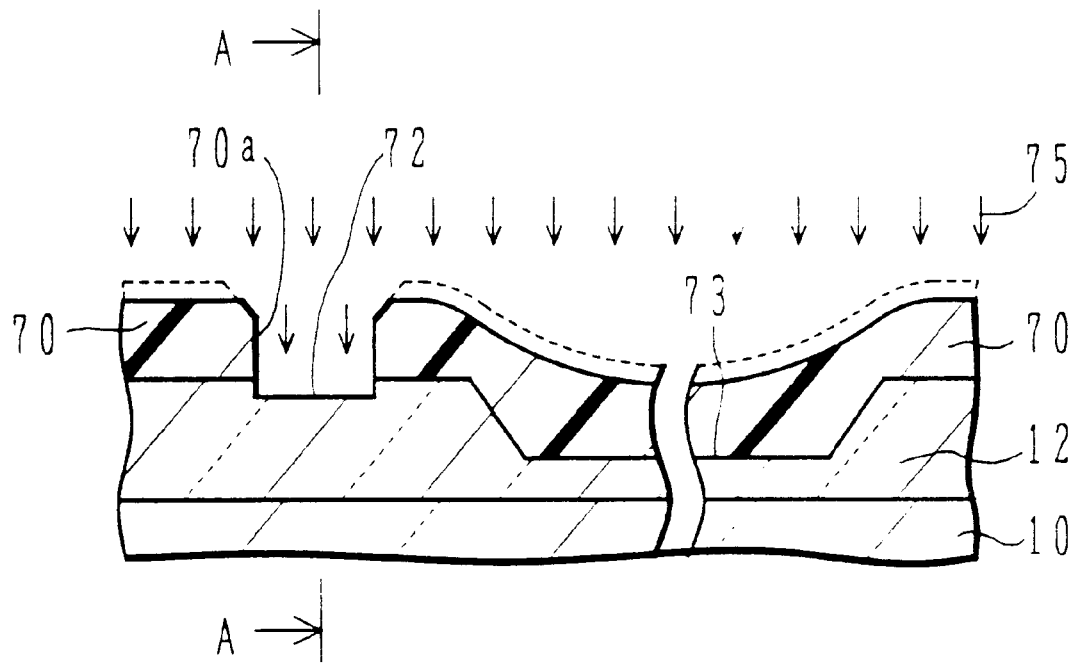
Figure 9D:
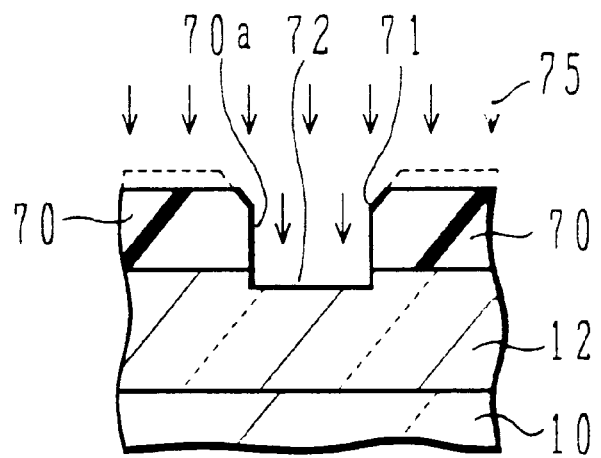

FIG. 9C is a cross sectional side view of the thin film magnetic head, and FIG. 9D is a cross sectional front view as viewed from line A—A of FIG. 9C. Ion beams (or other particle beams) 75 are vertically applied to the whole surface of the wafer to vertically mill the protection layer 12 exposed in the opening 70a of the resist film 70 and to form a recess 72 in the protection layer 12 (milling process by dry etching such as Ar ion etching). The depth of the recess 72 is determined from the thickness P1 of the lower pole 36 at the central parallel portion 40a.

If the thickness of the resist film 70 coated prior to applying the ion beams is set to about 8 μm, the depth of the recess 72 can be set to about 1.5 μm. The thickness of the resist film 70 is determined from the milling rate ratio of the protection layer (e.g., alumina) 12 to the resist film 70. Milling is enhanced at the upper corner of the opening 70a of the resist film 70, similar to the milling process for the whole surface of the protection layer 12 to be described later. It is necessary to determine the thickness of the resist film 70 so that the milling process is terminated before the lowest portion 71 of the obliquely milled corner (beveled corner) reaches the protection layer 12.

(9) Removal of Resist

Figure 9E:
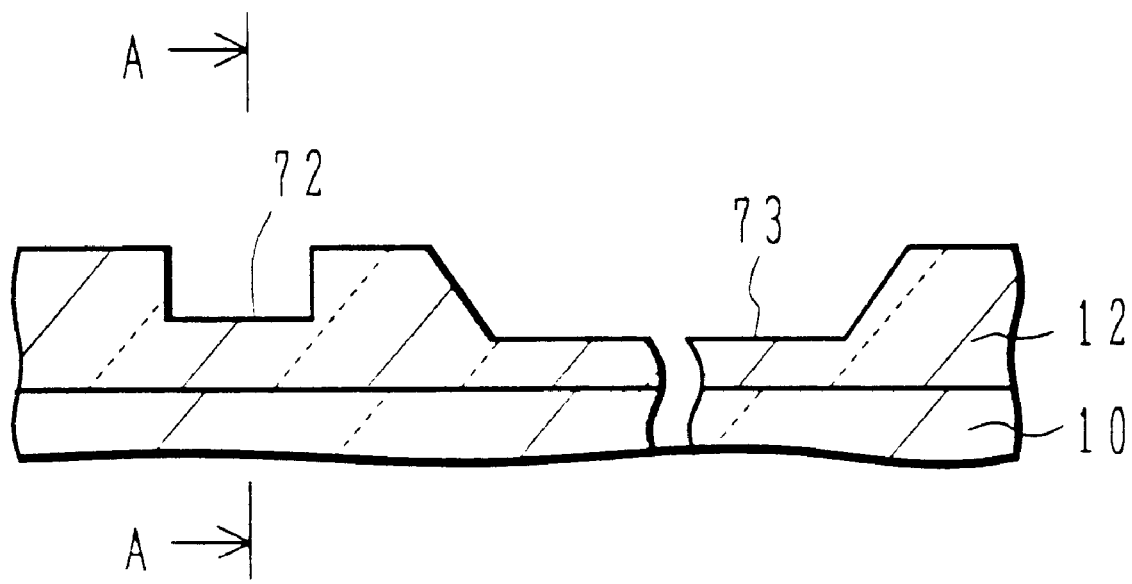
Figure 9F:
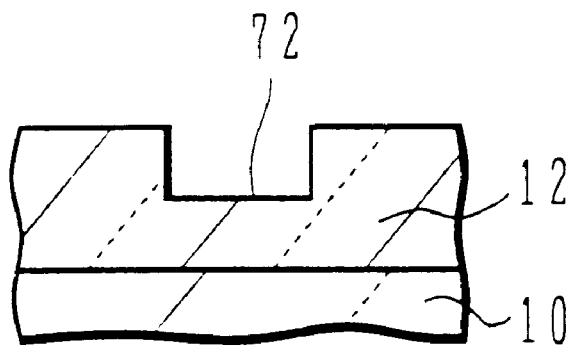

FIG. 9E is a cross sectional side view of the thin film magnetic head, and FIG. 9F is a cross sectional front view as viewed from line A—A of FIG. 9E. After the milling process, the resist film 70 is removed.

(10) Milling Whole Surface of Protection Layer

Figure 10A:
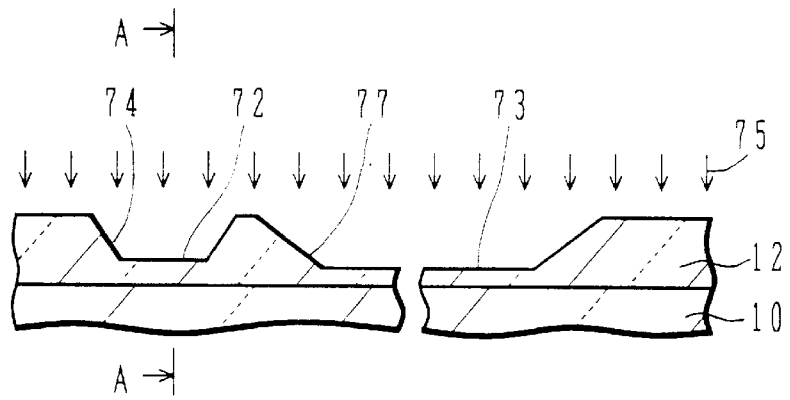
FIGS. 10A, 10B, 10C, 10D, 10E and 10F are cross sectional views illustrating the processes to be followed by the processes illustrated in FIGS. 9A, 9B, 9C, 9D, 9E and 9F.
Figure 10B:
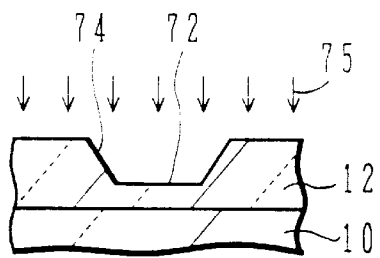

FIG. 10A is a cross sectional side view of the thin film magnetic head, and FIG. 10B is a cross sectional front view as viewed from line A—A of FIG. 10A. Ion beams (or other particle beams) 75 are vertically applied to the whole surface of the wafer shown in FIGS. 9E and 9F to perform a milling process. For example, Ar ion beams are used for this milling process. Since the milling is enhanced at the upper corner of the recess 72, the side wall 74 of the recess 72 is milled obliquely (faceted or beveled) at a constant angle and a slanted surface is formed. The side wall 77 of the recess 73 is also milled obliquely. When the side wall 74 of the recess 72 is milled obliquely to the bottom of the wall, the milling process is terminated. This process has a controllability far better than that when a milling process such as ion etching is performed by using a mask such as an obliquely formed resist film shown in FIGS. 8A to 8F. Therefore, the precision of the dimensions of the slanted surface 74 and other areas can be controlled to be 0.3 μm or smaller.

Figure 14:
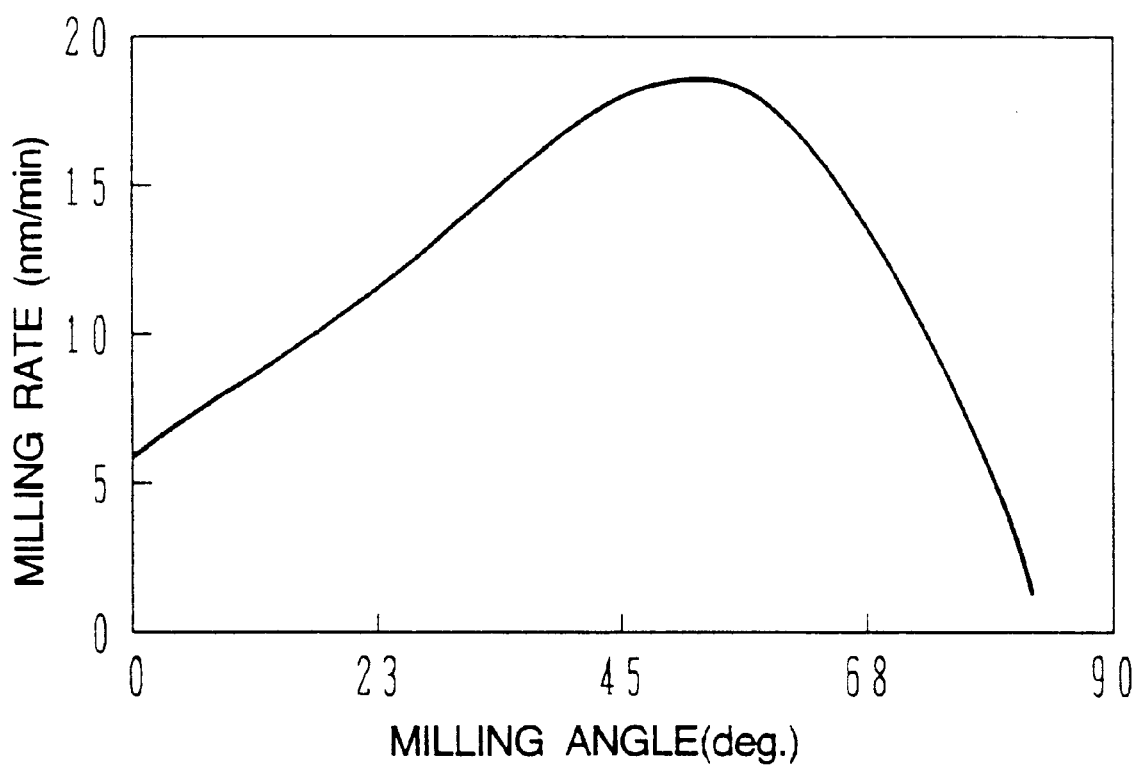
FIG. 14 is a graph showing the relationship between a motion direction of milling particles and a milling rate.

The mechanism why the side wall 74 is obliquely milled to the bottom of the wall at a constant angle will be discussed. There is a relationship between the motion direction of milling particles and the milling rate, as seen from the graph shown in FIG. 14. The larger the milling angle, the faster the milling rate. If alumina is used, a maximum milling rate is obtained in the slanted angle range of 40° to 60°. Therefore, if the surface of an aluminum layer having a right angle step is milled, the milling progresses at the maximum milling rate at the upper corner of the step.

Figure 15A:
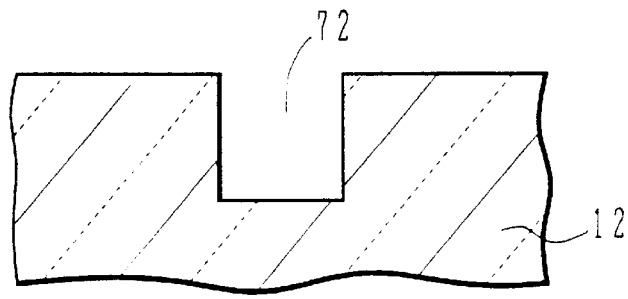
FIGS. 15A, 15B, 15C and 15D are cross sectional views illustrating how the inner wall of a recess is formed into a slanted surface at a constant angle in the processes illustrated in FIGS. 10A and 10B.
Figure 15B:
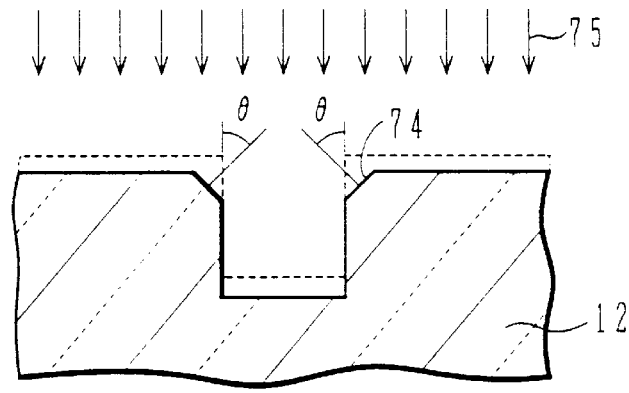
Figure 15C:
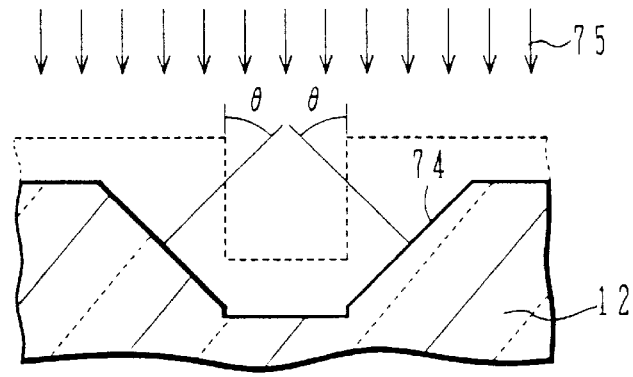
Figure 15D:
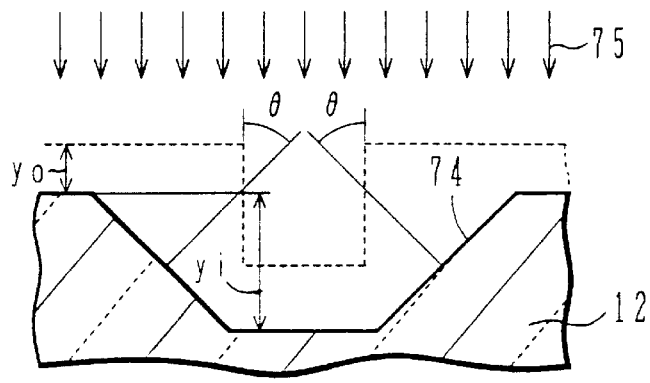
Figure 16A:
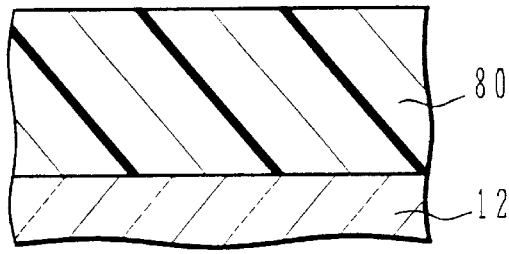
FIGS. 16A, 16B, 16C, 16D and 16E are cross sectional views illustrating how a recess is formed in the protection layer.
Figure 16B:
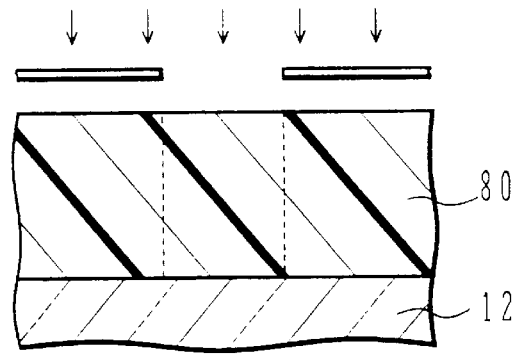
Figure 16C:
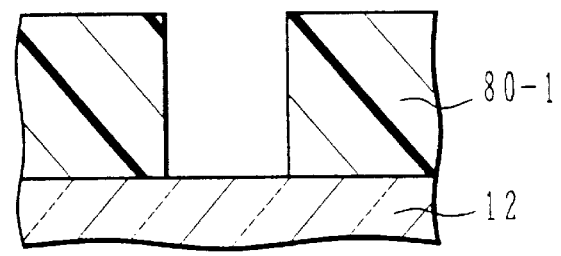
Figure 16D:
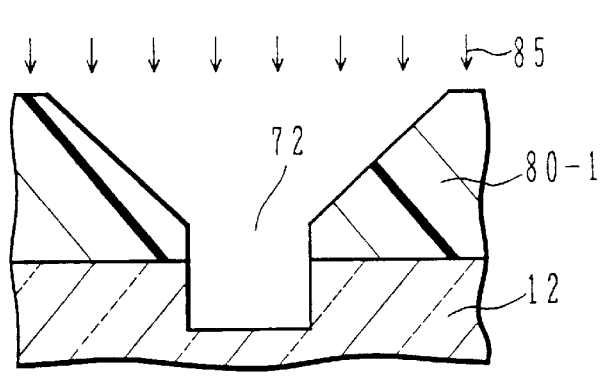
Figure 16E:
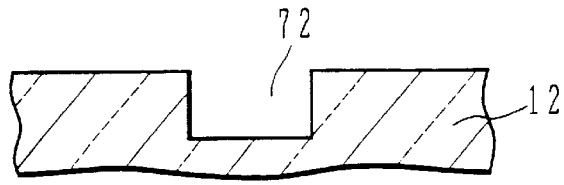

The processes of vertically applying ion beams to the whole surface of the protection layer 12 (e.g., alumina) and obliquely milling the side wall of the recess 72 at a constant angle, will be described with reference to the cross sectional views of the protection layer 12 shown in FIGS. 15A to 15D.

i) Referring to FIG. 15A, the protection layer 12 is vertically cut by photolithography and etching to form the recess 72 in the protection layer 12. The vertical etching of the protection layer 12 is performed as shown in FIGS. 16A to 16E. As shown in FIG. 16A, a resist layer 80 is coated on the protection layer 12. The resist layer 80 is 8 μm in thickness, for example. Subsequently, the resist layer 80 is exposed to light beam (FIG. 16B), and is developed to form a desired resist pattern 80-1 (FIG. 16C). As shown in FIG. 16D, after formation of the resist pattern 80-1, milling particles 85 are vertically applied to the whole surface of the protection layer 12 through the resist pattern 80-1 so as to form a recess 72. Through the ion-milling process, the upper corner of the resist pattern 80-1 is faceted (beveled). Next, the resist pattern 80-1 is removed (FIG. 16E).

ii) Referring to FIG. 15B, milling particles 75 are vertically applied to the whole surface of the protection layer 12. The upper corner or edge 74 of the recess 72 is slanted by the angle θ relative to the beams of milling particles 75, so that the edge 74 is milled at the maximum milling rate.

iii) Referring to FIG. 15C, if alumina is used, the milling rate is fastest at an angle θ of 40° to 60° so that the edge 74 is milled at this angle.

iv) Referring to FIG. 15D, when the edge 74 is milled to the bottom of the side wall, the vertical surface of the side wall disappears. Thereafter, as the milling further progresses, the upper corner of the slanted surface as well as the bottom (lower side) of an inverted trapezoid widens while maintaining the constant angle of the slanted surface. $y_o$ represents a thickness of the milled upper surface of the protection layer 12, and $y_i$ represents a height (depth from the upper side to the lower side) of the inverted trapezoid after the milling. A ratio of $y_o$ to yi corresponds to a ratio of a milling rate at the angle 0° to the maximum milling rate.

(11) Formation of Underlying Layer for Plating

Figure 10C:
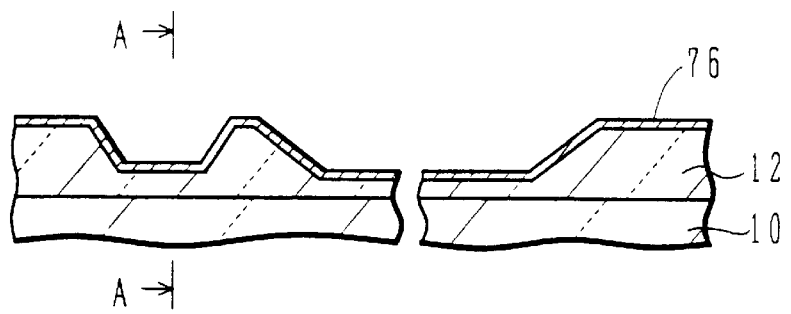
Figure 10D:
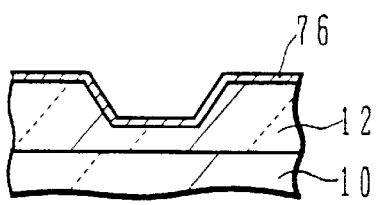

FIG. 10C is a cross sectional side view of the thin film magnetic head, and FIG. 10D is a cross sectional front view as viewed from line A—A of FIG. 10C. An underlying layer 76 for plating is formed on the whole surface of the wafer by sputtering or evaporation. The underlying layer 76 is made of, for example, permalloy.

(12) Cutting Resist Film

Figure 10E:
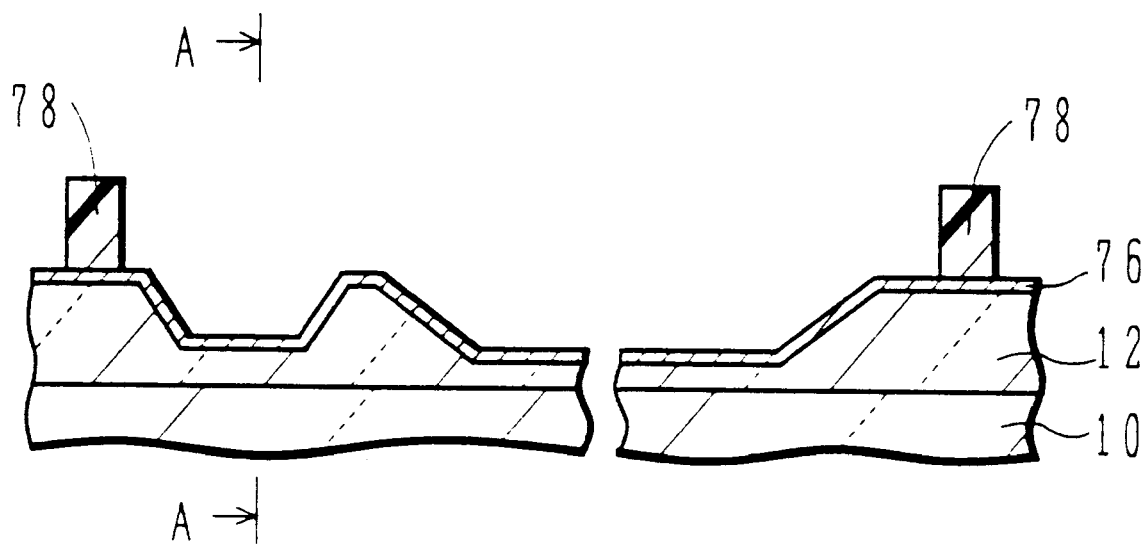
Figure 10F:
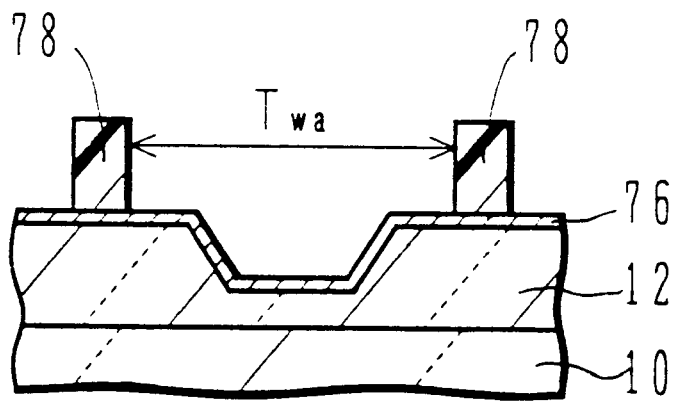

FIG. 10E is a cross sectional side view of the thin film magnetic head, and FIG. 10F is a cross sectional front view as viewed from line A—A of FIG. 10E. A resist film is formed on the underlying layer 76 and cut by photolithography to form a resist pattern 78. This resist pattern 78 is used for forming the lower magnetic layer 14 inclusive of the lower pole 36 by plating. The resist pattern 78 has a width defined by inner walls same as the lateral width $T_{wa}$ of the lower pole 36.

(13) Plating Lower Magnetic Layer

Figure 11A:
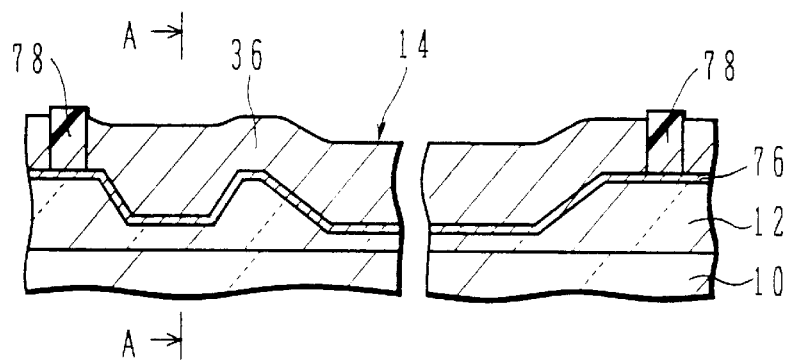
FIGS. 11A, 11B, 11C, 11D, 11E and 11F are cross sectional views illustrating the processes to be followed by the processes illustrated in FIGS. 10A, 10B, 10C, 10D, 10E and 10F.
Figure 11B:
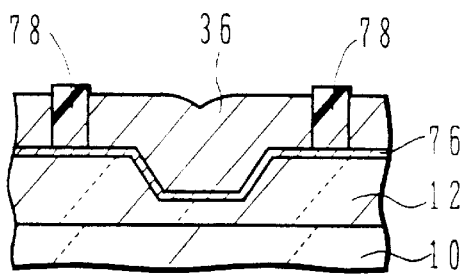

FIG. 11A is a cross sectional side view of the thin film magnetic head, and FIG. 11B is a cross sectional front view as viewed from line A—A of FIG. 11A. The lower magnetic layer 14 inclusive of the lower pole 36 is formed on the exposed underlying layer 76 with magnetic material to a thickness of 5 to 6 μm, for example by plating permalloy.

(14) Removal of Resist Pattern

Figure 11C:
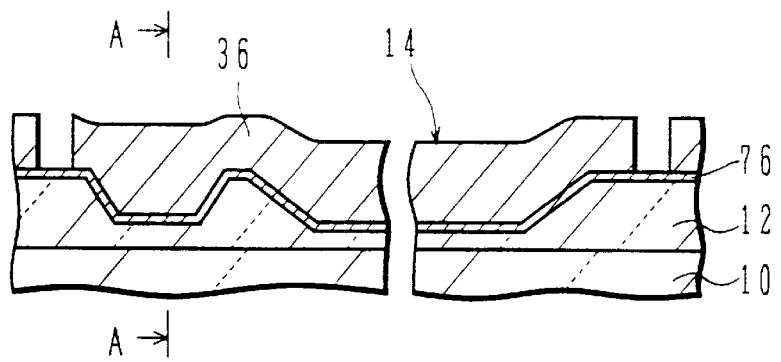
Figure 11D:
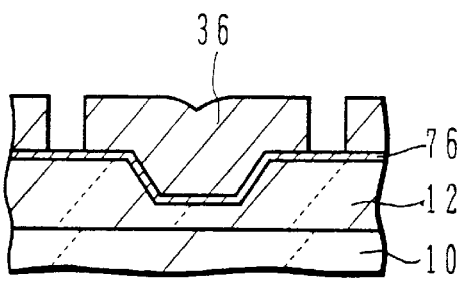

FIG. 11C is a cross sectional side view of the thin film magnetic head, and FIG. 11D is a cross sectional front view as viewed from line A—A of FIG. 11C. The resist pattern 78 is removed. The underlying layer 76 is exposed through holes formed by removing the resist pattern 78.

(15) Milling Underlying Layer

Figure 11E:
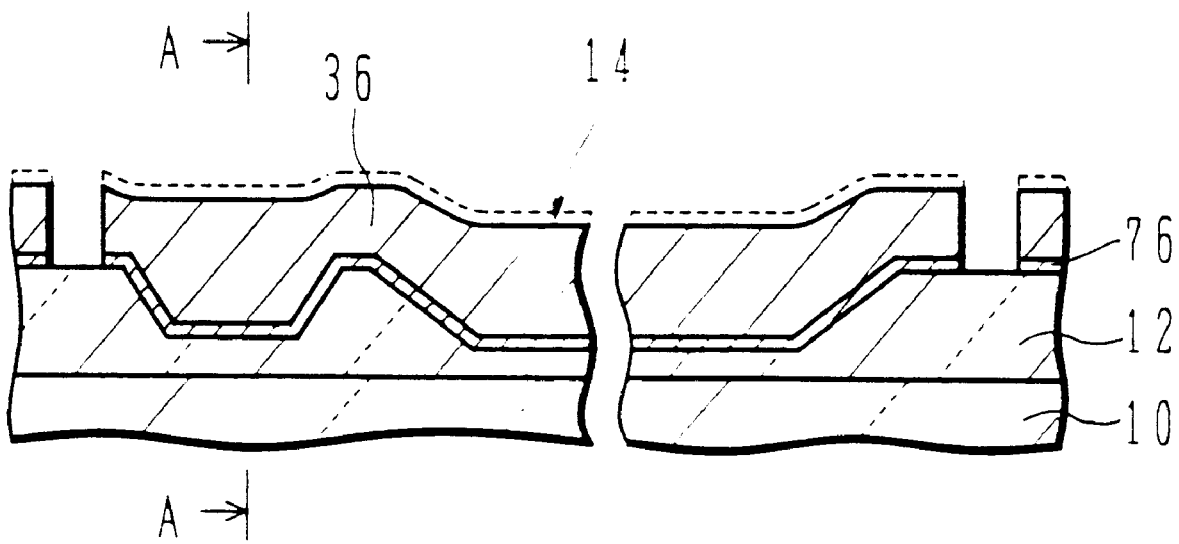
Figure 11F:
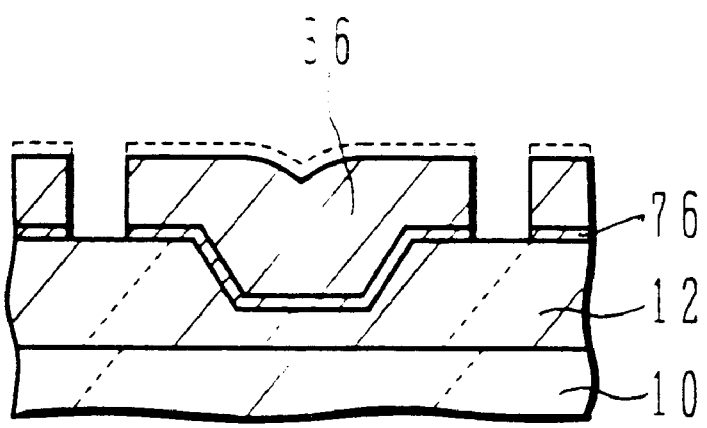

FIG. 11E is a cross sectional side view of the thin film magnetic head, and FIG. 11F is a cross sectional front view as viewed from line A—A of FIG. 11E. The underlying layer 76 exposed after the removal of the resist pattern 78 is removed by ion etching.

(16) Removal of Unnecessary Plated Film

Figure 12A:
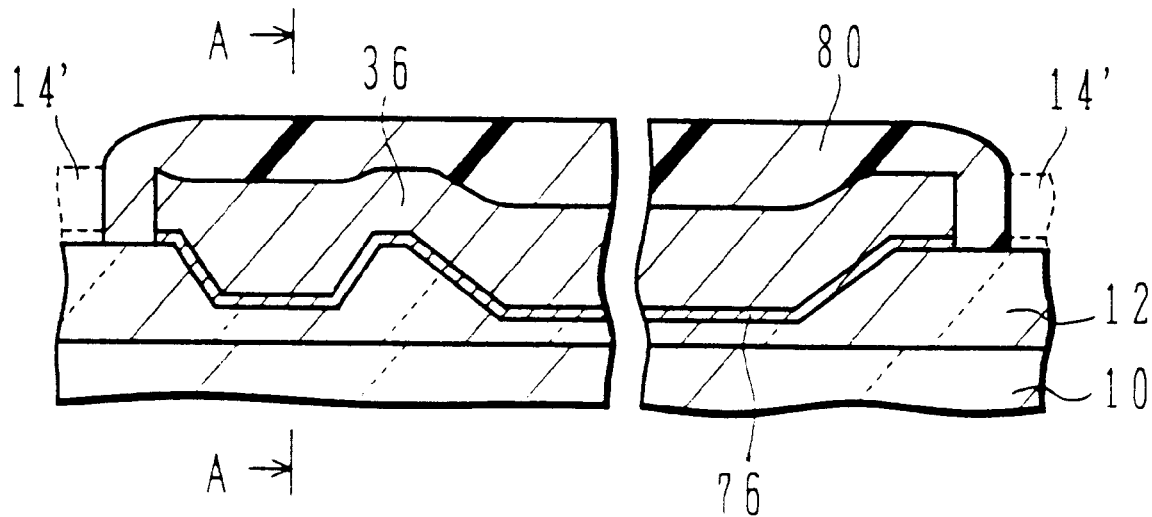
FIGS. 12A, 12B, 12C, 12D, 12E and 12F are cross sectional views illustrating the processes to be followed by the processes illustrated in FIGS. 11A, 11B, 11C, 11D, 11E and 11F.
Figure 12B:
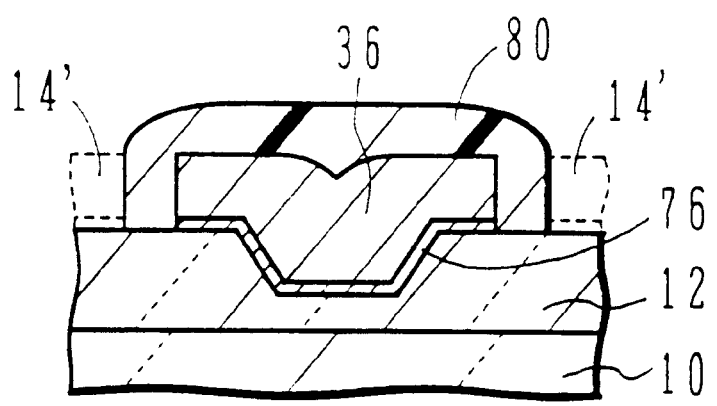

FIG. 12A is a cross sectional side view of the thin film magnetic head, and FIG. 12B is a cross sectional front view as viewed from line A—A of FIG. 12A. A protective resist film 80 is coated over the lower magnetic layer 14 inclusive of the lower pole 36, and an unnecessary plated film not covered with the resist film 80 is removed by wet etching or other processes. Thereafter. the resist film 80 is removed.

(17) Forming Inorganic Insulating Film

Figure 12C:
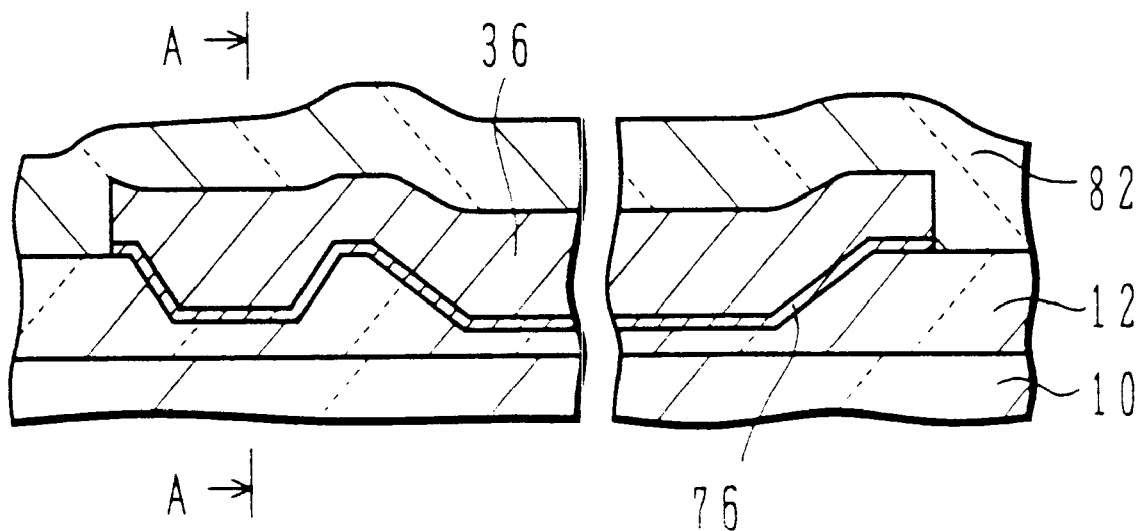
Figure 12D:
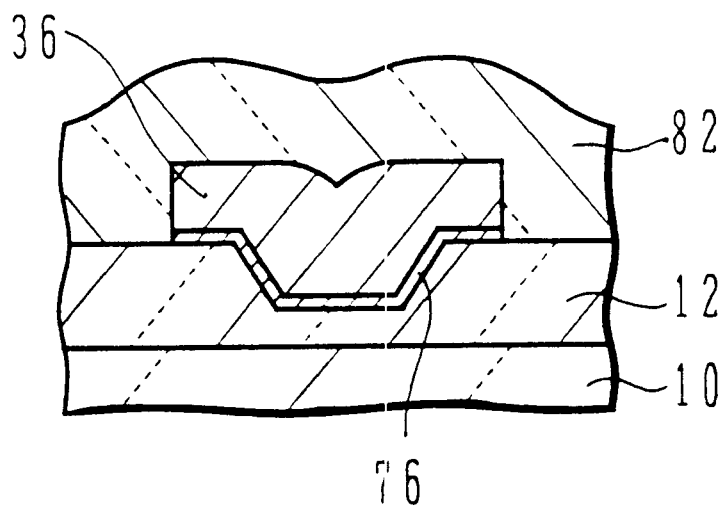

FIG. 12C is a cross sectional side view of the thin film magnetic head, and FIG. 12D is a cross sectional front view as viewed from line A—A of FIG. 12C. An inorganic insulating film 82 such as alumina is formed over the whole surface of the wafer to a thickness of 8 to 12 μm.

(18) Final Lapping

Figure 12E:
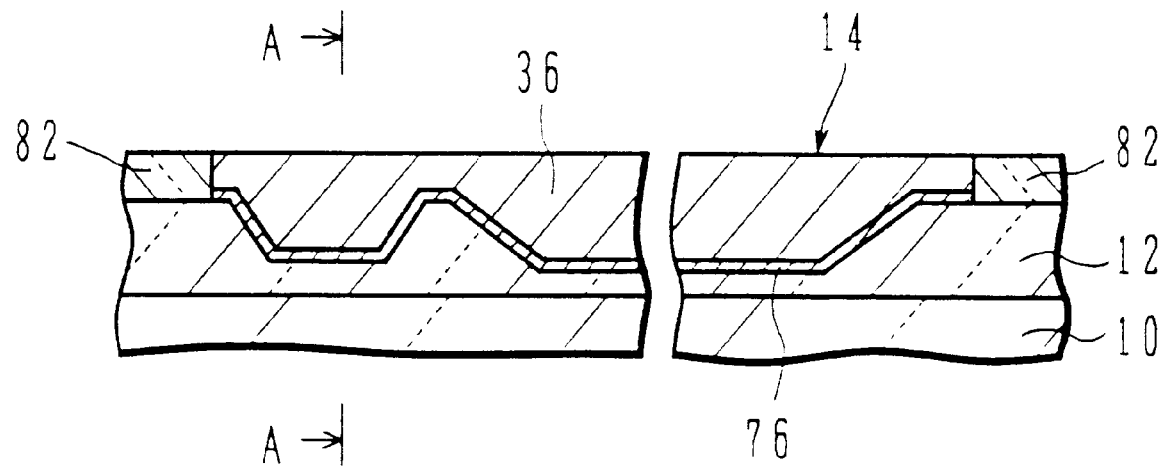
Figure 12F:
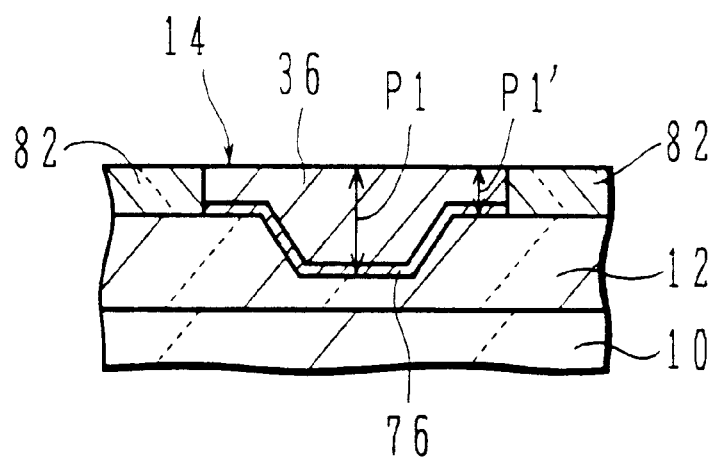

FIG. 12E is a cross sectional side view of the thin film magnetic head, and FIG. 12F is a cross sectional front view as viewed from line A—A of FIG. 12E. The whole surface of the wafer is lapped to expose and planarize the lower magnetic layer 14 inclusive of the lower pole 36 and to obtain the predetermined thicknesses P1 and P1' of the lower pole 36. With the above processes, the lower pole shape shown in FIGS. 1B and 1C can be formed precisely.

(19) Other processes

Figure 13A:
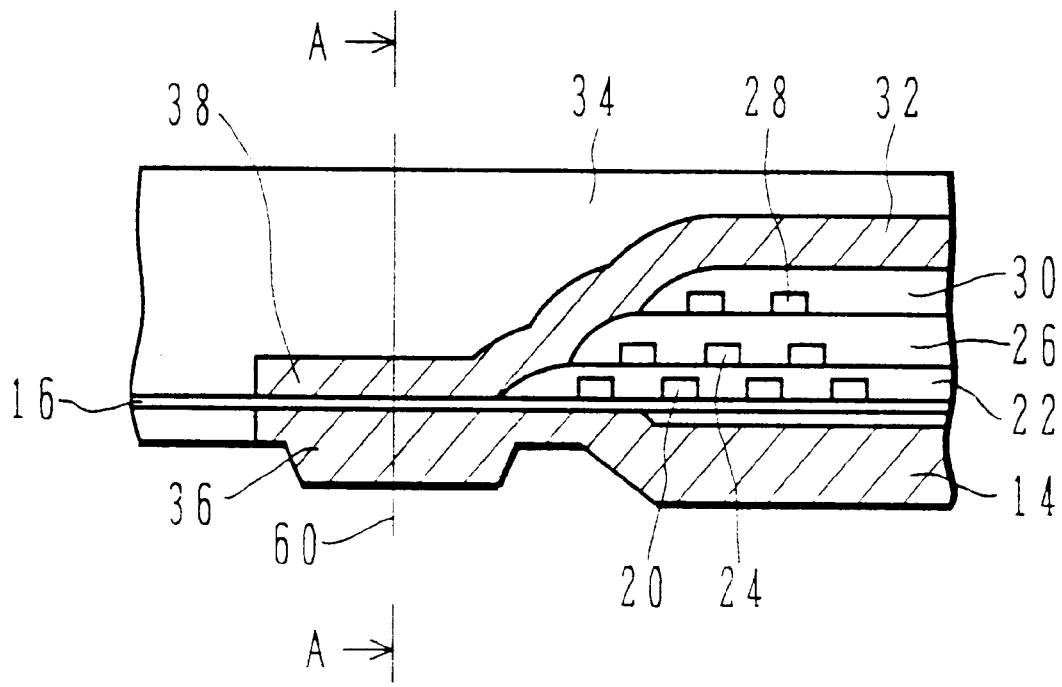
FIGS. 13A and 13B are cross sectional views illustrating the processes to be followed by the processes illustrated in FIGS. 12A, 12B, 12C, 12D, 12E and 12F.
Figure 13B:
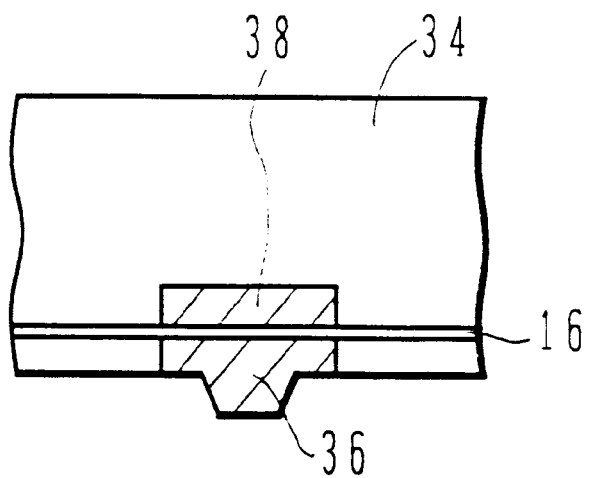

FIG. 13A is a cross sectional side view of the thin film magnetic head, and FIG. 13B is a cross sectional front view as viewed from line A—A of FIG. 13A. After the magnetic gap layer 16, coil layers 20, 24, and 28, and insulating layers 22, 26 are formed, the upper magnetic layer 32 inclusive of the upper pole 38 is formed. The passivation film 34 is formed last. The wafer is then cut and lapped to a level 60 corresponding to the predetermined throat height to complete the thin film magnetic head 2 shown in FIG. 1A. This manufacture method can form precisely the slanted portion matching the conditions of the thin film magnetic head of the embodiment, and a high yield is possible.

The present invention has been described in connection with the preferred embodiments. The invention is not limited only to the above embodiments. It is apparent to those skilled in the art that various modifications, improvements, combinations and the like can be made without departing from the scope of the appended claims.

We claim:

1. A method of manufacturing a thin film magnetic head comprising the steps of:

applying particle beams vertically to a surface of an inorganic insulating substrate to mill an inorganic insulating substrate and form a recess;

applying particle beams vertically to a surface of the recess and a nearby area to reform a side wall surface of the recess into a slanted surface which reaches a bottom of the recess;

forming a pole material layer on the surface of the inorganic insulating substrate to fill the recess with the pole material layer and planarizing a surface of the pole material layer in parallel with the bottom surface of the recess; and forming a non-magnetic layer on the surface of the pole material layer to form a magnetic gap.

2. A method of manufacturing a thin film magnetic head according to claim 1, wherein the step of forming the recess on the surface of the inorganic insulating substrate includes the step of forming a resist mask on a surface of the inorganic insulating substrate and thereafter applying particle beams to the surface of the exposed inorganic insulating substrate to form a recess.

3. A method of manufacturing a thin film magnetic head according to claim 2, wherein the step of reforming the side wall surface of the recess into the slanted surface includes the step of removing the resist mask formed on the surface of the inorganic insulating substrate and thereafter applying particle beams.

4. A method of manufacturing a thin film magnetic head according to claim 1, wherein the step of forming the pole material layer includes the step of forming an underlying layer on the surface of the inorganic insulating substrate and the step of forming a magnetic layer on the underlying layer.

5. A method of manufacturing a thin film magnetic head according to claim 4, wherein the step of forming the pole material layer includes the step of forming a pole material layer on a surface of the recess and a nearby area and the step of forming an inorganic insulating layer on a surface area covering the pole material layer on the surface of the inorganic insulating substrate.

6. A method of manufacturing a thin film magnetic head according to claim 5, wherein the step of forming the pole material layer further includes the step of forming an underlying layer on the surface of the inorganic insulating substrate, the step of forming a resist film on a surface area covering the recess on the underlying layer, and the step of forming a magnetic material layer on the underlying layer not covered with the resist film.

7. A method of manufacturing a thin film magnetic head according to claim 6, wherein the step of forming the pole material layer further includes the step of removing the resist film and a portion of the underlying layer exposed thereby.

8. A method of manufacturing a thin film magnetic head according to claim 7, wherein the step of forming the pole material layer further includes the step of forming a resist film covering the pole material layer filled in the recess, the step of removing the pole material layer on the inorganic insulating substrate not covered with the resist film, and the step of removing the resist film.

9. A method of manufacturing a thin film magnetic head according to claim 5, wherein the step of forming the pole material layer further includes the step of lapping the pole material layer and the inorganic insulating layer covering the pole material layer to form a flush surface thereof, the flush surface being in parallel to the bottom of the recess.

10. A method of manufacturing a thin film magnetic head according to claim 1, wherein a width of the bottom surface of the recess is 10 to 25% of a total width of the pole material layer;

a width of an upper end of the recess is 60 to 80% of the total width of the pole material layer; and a thickness of end portion of the pole material layer is $1/3$ to $2/3$ of a thickness of the pole material layer on the bottom surface of the recess.

11. A method of manufacturing a thin film magnetic head according to claim 1, wherein the inorganic insulating substrate is made of alumina.

12. A method of manufacturing a thin film magnetic head according to claim 11, wherein the step of reforming the side wall surface of the recess into the slanted surface sets an angle between the slanted surface of the recess and the bottom of the recess to 40° to 60°.

13. A method of manufacturing a thin film magnetic head according to claim 12, wherein the pole material layer is made of permalloy.

* * * * *